W. A. GILL.
ROTARY VALVE.
APPLICATION FILED MAR. 26, 1915.

1,292,597.

Patented Jan. 28, 1919.
2 SHEETS—SHEET 2.

WITNESSES:
Wm. S. Schmitt
D. E. Crabb

INVENTOR
Wm. A. Gill.
BY
ATTORNEY

UNITED STATES PATENT OFFICE.

WILLIAM A. GILL, OF PORTLAND, OREGON, ASSIGNOR TO GILL-COOK-VALVE CO., OF PORTLAND, OREGON, A CORPORATION OF OREGON.

ROTARY VALVE.

1,292,597.  Specification of Letters Patent.   Patented Jan. 28, 1919.

Application filed March 26, 1915. Serial No. 17,282.

*To all whom it may concern:*

Be it known that I, WILLIAM A. GILL, a citizen of the United States, and a resident of Portland, county of Multnomah, and State of Oregon, have invented a new and useful Improvement in Rotary Valves, of which the following is a specification.

My invention has for its object the providing of a rotating one-piece valve spaced apart from the walls of its chamber and rendered gas-tight by encompassing the same with a packing jacket composed of a plurality of detached segmental plates. Means are provided for holding the segmental plates in place on the periphery of the valve, and concentric springs are provided between the valve and the segmental plates for holding the latter in gas-tight relation with the faces of the valve chamber. In such construction the one-piece valve will sustain the strain of the explosion and proportionately relieve the packing segments, at the same time will permit the gas to enter between the valve and said packing segment and thus contribute to the holding of the latter effectively on their seats in the valve chamber at the instant of explosion. In this respect my present invention gives the same gas-tight efficiency as obtained in my valve described in the Letters Patent of the United States dated March 9, 1915, and numbered 1,130,896. Like in the latter construction, the detached concentric plates or packing segments are free to grind themselves in service on their valve seats in true gas-tight relation to the latter. If the packing member were made of one piece with a longitudinal split, the spring of the metal would have to be relied upon for maintaining such packing member in gas-tight contact with the seat; but since such packing member is constrained and is not adapted to permit all portions of its bearing surface to freely and uniformly bear on the opposed surfaces of the valve chamber, such packing member will soon wear into a state when it no longer is gas-tight, except possibly at the instant of explosion.

Another advantage obtained by the construction above referred to is this: Since the valve is not in close mechanical contact with the packing segments, but is in greater part spaced therefrom, the valve will have a tendency to retain a higher temperature within the combustion chamber than that attained by the packing-segments, thereby increasing the thermal efficiency of the motor, for the gas in the space between the valve and the packing segments will serve as an insulator, effectively retarding the wasteful distribution of the heat through the medium of the packing-segments, and the walls of the valve chamber.

A further advantage attained by the construction above referred to is this: Since the packing segments have a lower temperature than the valve, the efficiency of the film of lubricant covering the working faces of the packing-segments is not diminished, as would be the case if the latter were heated to a higher degree.

Incidentally, the valve may be provided with an integral stem directly connected with the thrust-bearing, and having mounted thereon the drive-gear of the means for rotating the valve.

Other features of my invention will become apparent from the detailed description thereof hereinafter given.

In the drawings, hereby referred to as a part of this specification,

In describing the drawings, I shall only point out such details of construction as directly relate to my present invention.

Figure 1:
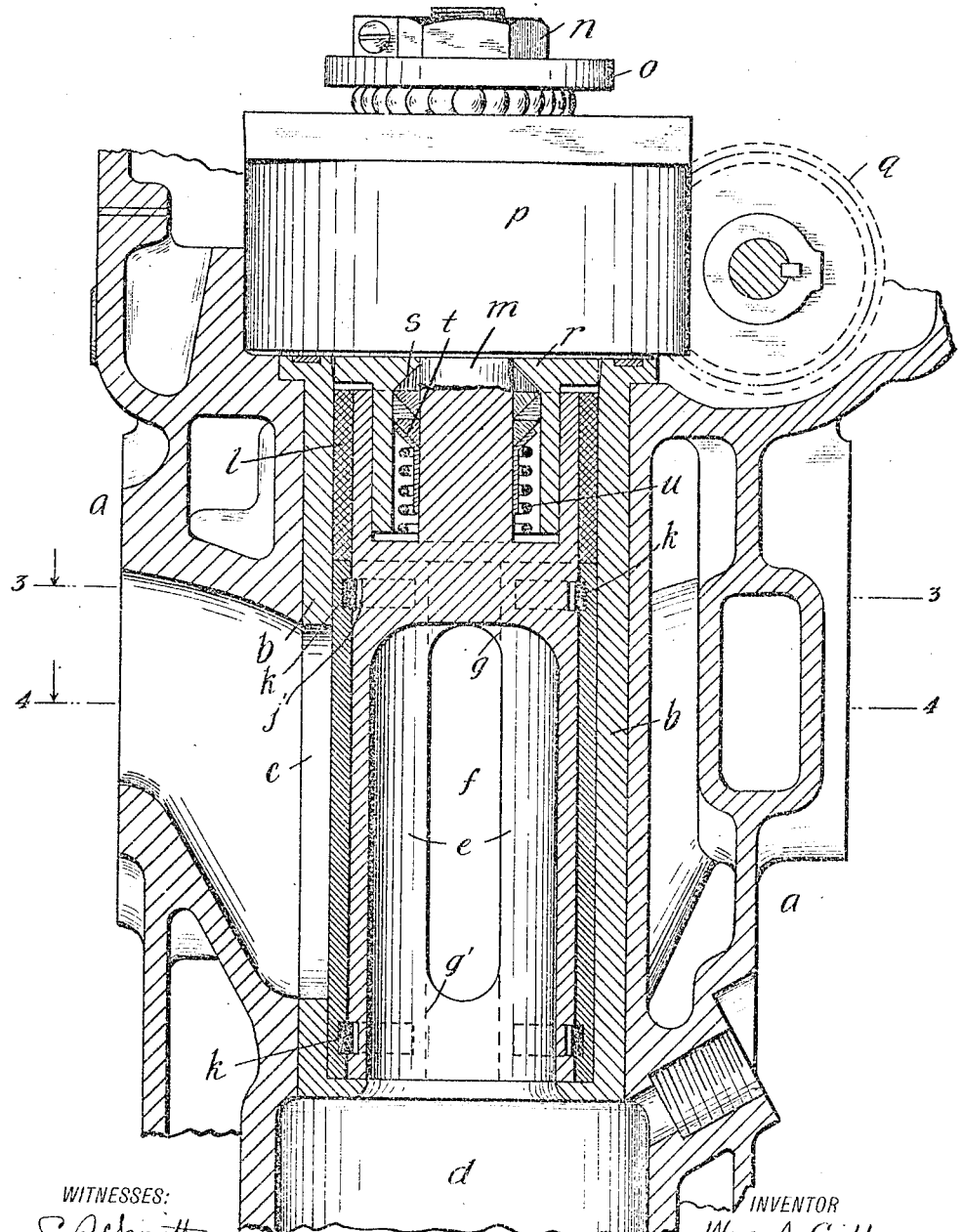
Figure 1 is a vertical, longitudinal section taken on the line 1—1 of Fig. 3.
Figure 2:
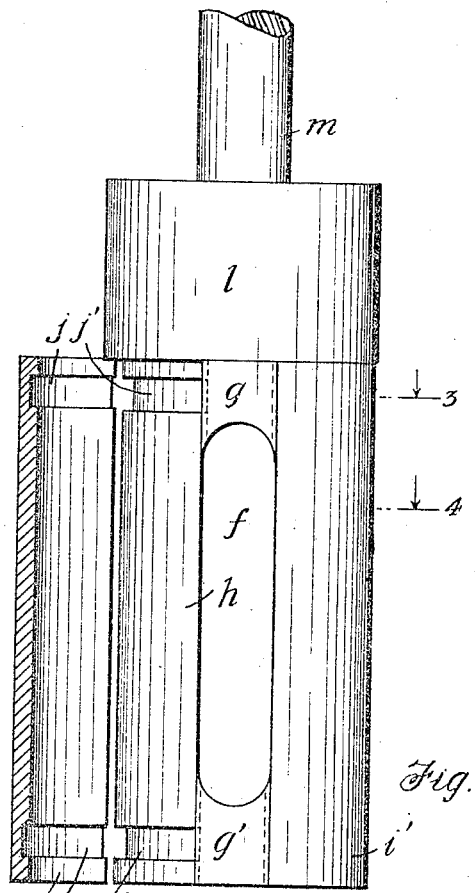
Fig. 2 is an elevation of the valve on the periphery of which are placed the packing-segments; the right-hand packing segment is shown as in place on the periphery of the valve, while the left hand packing-segment is shown in section, and as removed from the valve.
Figure 3:
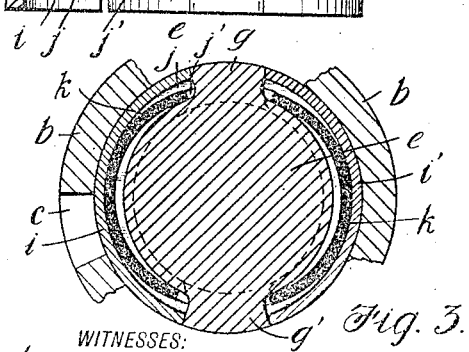
Fig. 3 is a horizontal section taken on the planes indicated by the line 3 of Figs. 1 and 2, showing the valve, the packing-segments, the springs whereby the packing-segments are held against their seats in the valve-chamber, and the valve bushing.

*a* is the valve casing; *b* the bushing of the casing; *c, c'* represent the inlet and exhaust ports of the casing; *d* is the upper end of the motor cylinder. In the valve chamber is the valve e, provided with ports f, corresponding to those of the valve casing. The valve is made in its upper and lower portions with peripheral protrusions g, g'. The diameter of the valve with respect to the exterior surfaces of said protrusions is such, however, that the latter will not touch the walls of the valve chamber. The exterior of the valve e has recesses, as shown by h, in the left-hand portion of Fig. 2, and in such recesses are seated the packing-segments i, i'. The opposed faces of the packing-segments i, i', and the valve e, are provided with peripheral companion recesses j, j', and in such recesses are located springs k, k, by which the packing-segments are normally held against their seats on the wall casing. Above the packing-segments i, i', there is placed on the valve e, a centering ring l, of slightly greater diameter than the valve e, including the protruding portions g, g'. The valve is made with a stem, m, on the extremity of which is threaded a nut n, bearing on the plate o of the thrust-bearing. p is a chambered portion of the thrust-bearing, within which, it is to be understood, there is mounted a gear meshing with the valve driving gear q. r is a plate having an annular pendent flange seated in the annular cavity therefor provided in the upper portion of the valve e, and forming of such annular cavity a chamber for holding the packing element, consisting of packing rings s, held in place by a gland t, supported by a spring u.

The details of the means of rendering my valve gas-tight and of the thrust-bearing are to be understood as similar to those described in my application for Letters Patent for an improvement in gas-tight closure for cylinder of rotator, filed March 15, 1915, under Serial No. 14,622, although the construction of these details is not important as bearing on my present invention.

Figure 4:
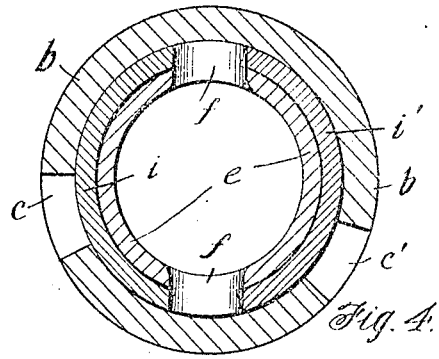
Fig. 4 is a cross-section of Fig. 2 on the line 4.
Figure 5:
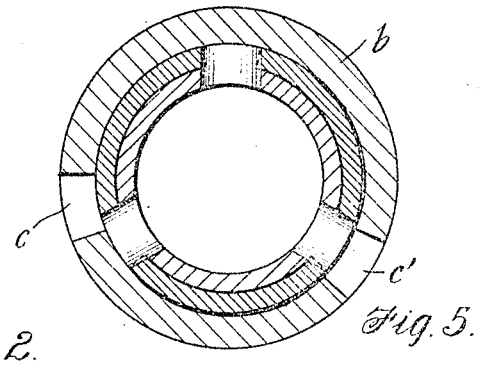
Figs. 5 and 6 show cross-sections approximately taken on the line 4 of Fig. 2, and illustrate that the valve may be made of various forms with respect to the number of packing-segments used, and still embody the principle of my invention.
Figure 6:
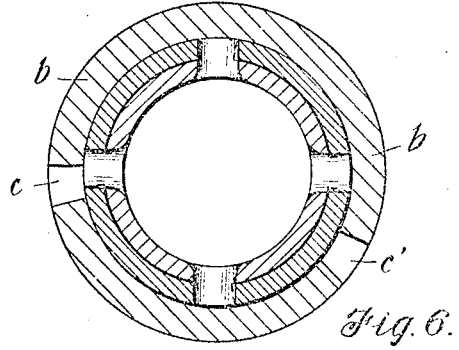

As already mentioned, the cross-sections shown in Figs. 4 and 6 merely illustrate that the valve e may be made of three or more parts instead of one or two, as shown in the other figures of the drawings, and that the packing segments would be correspondingly arranged, and in all other respects the construction of the valve so modified would be the same as that described with respect to the illustration of my valve in Figs. 1 to 4 of the drawings.

I claim:

1. In a rotary valve, the combination of a valve chamber axially alined with the combustion chamber, a valve rotating in the valve chamber, the valve being hollowed out in its lower portion, concentric packing pieces encompassing the hollowed portion of the valve, the opposed faces of the valve and the packing pieces being provided with annular companion grooves, and springs located in said annular grooves and adapted for holding the packing pieces outward.

2. In a rotary valve, the combination of a valve chamber axially alined with the combustion chamber, a valve rotating in the valve chamber, the valve being hollowed out in its lower portion, concentric packing pieces encompassing the hollowed portion of the valve, springs between the exterior of the valve and the concentric packing pieces, such springs adapted for holding the latter outward, the valve chamber being provided at its inlet end with an internal flange providing a seat for the lower ends of the valve and the packing pieces, and means for holding the valve seated on said internal flange of the valve chamber and a packing for the upper end of the valve.

3. In a rotary valve, the combination of a valve chamber axially alined with the combustion chamber, a valve rotating in the valve chamber, the valve being hollowed out in its lower portion, concentric packing pieces encompassing the hollowed portion of the valve, the opposed faces of the valve and the packing pieces being provided with annular companion grooves, springs located in said annular grooves and adapted for holding the packing pieces outward, the valve chamber being provided at its inlet end with an internal flange providing a seat for the lower ends of the valve and the packing pieces, and means for holding the valve seated on said internal flange of the valve chamber and a packing for the upper end of the valve.

WILLIAM A. GILL.

Witnesses:
WM. C. SCHMITT,
D. E. CRABB.

Copies of this patent may be obtained for five cents each, by addressing the "Commissioner of Patents, Washington, D. C."